Dec. 29, 1931.  A. W. SMITH  1,838,118
CEMENTING MACHINE
Filed Dec. 12, 1929
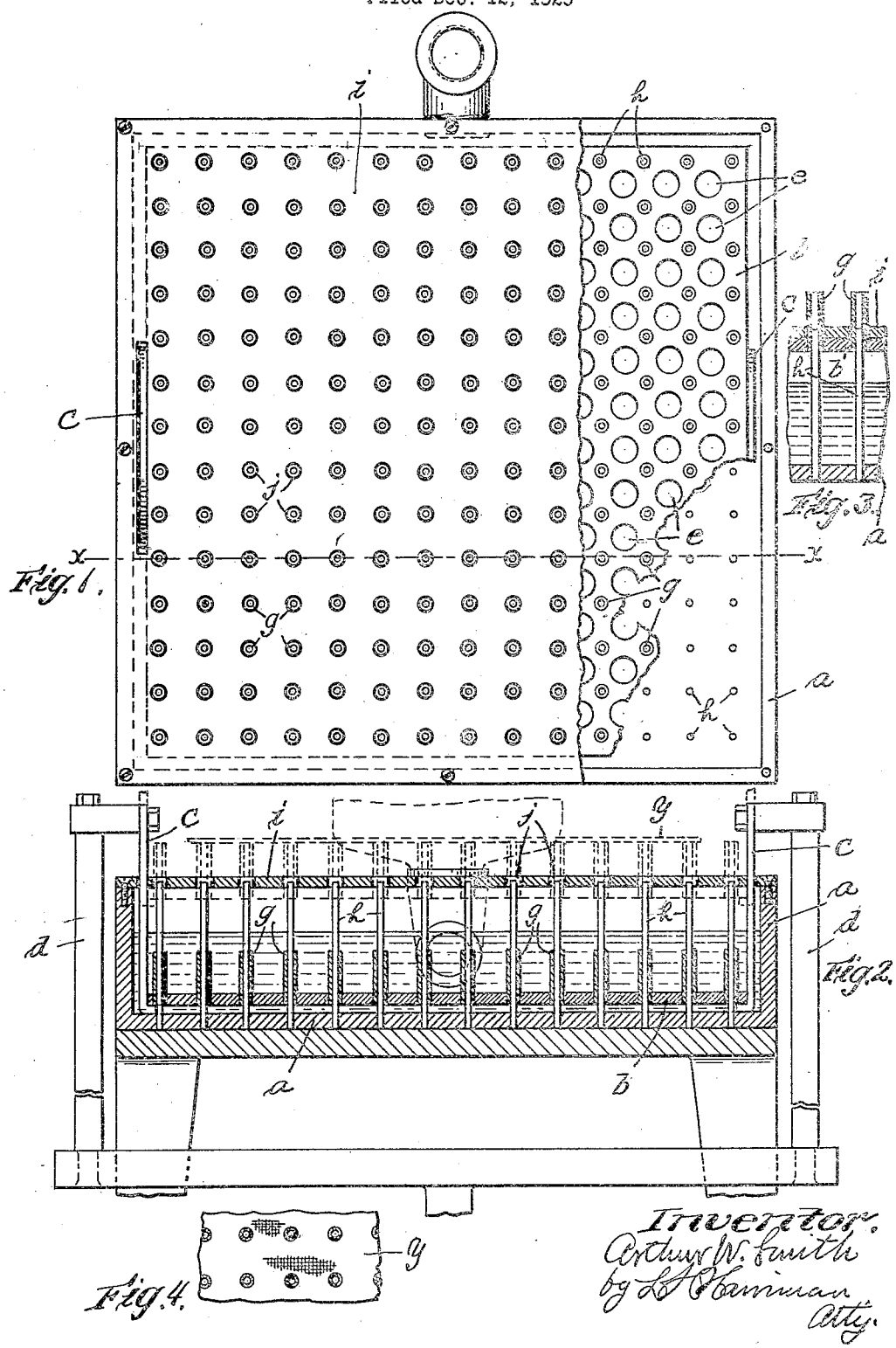

Patented Dec. 29, 1931

1,838,118

UNITED STATES PATENT OFFICE

ARTHUR W. SMITH, OF SALEM, NEW HAMPSHIRE

CEMENTING MACHINE

Application filed December 12, 1929. Serial No. 413,506.

This invention relates to certain improvements in cementing machines which are primarily designed for use in applying an adhesive to cloth doublers and linings which are cemented to the inner sides of pieces of upper leather used in the manufacture of shoes, and which are of the type in which a grid is submerged in liquid cement and then lifted horizontally above the liquid level, so that the cement drains from the grid and the part to be cemented may be laid thereon.

More specifically, the invention relates to certain improvements in a machine of the type shown in the United States patent to McMurray No. 1,293,147 dated February 4, 1919, in which the grid comprises a series of vertically disposed fingers, the top ends of which are disposed in the same horizontal plane and provide cement applying faces, which, when the grid is lifted, are held above the liquid level of the cement, so that the piece to be cemented may be laid on said faces, and cement will be applied in dots to its surface.

While machines of this type are satisfactory for many conditions, particularly, for example, in cementing cloth doublers to upper leather which is of medium or heavy weight, when cementing cloth doublers to very thin, or light weight leather, the results are likely to be unsatisfactory for the reason that the dots of cement which are applied form small bunches between the doubler and the leather, causing the surface of the leather to be slightly raised at the points at which the dots of cement are applied, with the result that the surface of the leather is given a somewhat pebbly appearance, which, under some conditions, is highly objectionable.

The primary object of my invention is to provide a machine of the type above referred to, which will apply the cement at points which are spaced apart in all directions, and which will also apply it in such a manner that it will not act to raise the surface of the leather at the point of application and therefore will not cause the leather to have the pebbly effect above referred to.

I accomplish this object by providing the grid of a machine of the type above referred to with a series of suitably spaced, open ended tubes, which extend vertically upward therefrom and terminate at a uniform level, so that the top ends of said tubes form a cementing surface, and by providing in connection therewith a corresponding series of rods which are mounted beneath the grid and extend upward through said tubes to points above the liquid level of the cement in the cement containing receptacle, and means for raising and lowering the grid, so that the tubes may be subberged in the cement and then lifted so that their top ends will be held above the ends of the rods and the work to be cemented may be applied thereto.

For a more complete disclosure of the invention, reference is made to the following specification, in connection with the accompanying drawings, in which:

Fig. 1 is a plan view, with certain portions broken away, of a cementing machine embodying my invention.

Fig. 2 is a sectional view thereof, at line $x$—$x$ of Fig. 1.

Fig. 3 is a fragmentary view, at said line $x$—$x$, showing the grid in raised position.

Fig. 4 is a view of a portion of a cloth doubler showing the manner in which the cement is applied.

As shown in the drawings, a suitably supported receptacle $a$, preferably in the form of a low sided pan, is provided, which is preferably of rectangular form, and in which liquid cement is maintained at a certain level, as indicated in Fig. 2, by means of an inverted reservoir, or like means, as indicated in dotted lines therein.

According to my invention, I provide a grid which preferably consists of a flat metal plate $b$, which is adapted to fit loosely within the pan $a$, and is supported horizontally therein by brackets $c$, which are connected to vertically disposed lifting rods $d$, so that said plate may be raised and lowered within the pan while supported horizontally. Said plate $b$ is suitably perforated, being provided with a series of rows of holes $e$ therethrough, and a series of small tubes $g$ are mounted in said plate between said holes, in perpendicular relation thereto, said tubes being extended up through the plate from its under side for a suitable distance above its upper side and being open throughout their entire lengths and open to the under side of the plate. The top ends of said tubes are terminated in the same horizontal plane, and form a cementing surface which is made up of a series of small annular faces, all of which are spaced apart from each other.

A series of stiff rods $h$ are fixed in the bottom of the pan and extend vertically therefrom within said tubes $g$, so that, as the plate $b$ is raised and lowered said tubes slide on said rods. A top or cover plate $i$ is secured on the top edges of the sides of the pan $a$ and forms a closure therefor, said plate $i$ being provided with a series of holes $j$ therethru which are in exact register with the tubes $g$ and which are closely fitted thereto, so that, when the plate $b$ is lifted, said tubes will pass through plate $i$ and will extend for a suitable distance above the level of its top surface when the top side of plate $b$ is engaged with its bottom surface, as shown in Fig. 3. The rods $h$ are arranged to terminate in the same horizontal plane and at a level approximately midway between the top and bottom surfaces of the top plate $i$, which is at a substantial distance above the normal liquid level in the pan.

In the normal operation of the machine when the grid or plate $b$ is lowered to the limit of its down movement, it will rest on the bottom of the pan $a$, in which position the top faces of the tubes $g$ will be carried below the liquid level of the cement in the pan, as indicated in Fig. 2. When the grid is raised to the limit of its upward movement, it will be lifted into engagement with the cover plate L, in which position the top ends of the tubes will be held in a horizontal plane at a level not only above the liquid level in the pan, but also at a substantial distance above the top side of plate $i$. The doubler Y, or other part to be cemented, will then be laid on the top faces of the tubes, as indicated in the dotted line position of Fig. 2. During the upward movement of the tubes, they will first emerge from the cement, and, as they are lifted, the cement about them or above the plate $b$ will be drained through the holes $e$ and between the edges of said plate and the sides of the pan, and then, as the tubes pass into the holes $j$ in the plate $i$ practically all surplus cement on the outer sides thereof will be scraped therefrom by said plate $i$, while, at the same time, the rods $h$, which extend above the bottom side of the plate $i$, will prevent, at all times, the entrance of any substantial amount of cement into said tubes, so that, when the upper portion of the tubes are carried above the top plate, the faces at the top ends thereof will have a coating of cement, while the inner and outer sides of the tubes adjacent said faces will be practically free of cement.

Consequently, when the doubler, or other articles to be cemented, is laid on the top faces of the tubes, the cement will be applied thereto in small circles only and in spaced relation, as indicated in Fig. 4.

In practice, the diameter of these small circles of cement is preferably somewhat greater than that of the dots of cement which are, in practice, applied by the fingers of the machine of said prior patent, but a relatively smaller quantity of cement will be applied, at each point, but whether the quantity applied is less or greater at each point, which obviously depends on the relative constructions, the cement will be distributed in such a manner that there will not be sufficient cement at any point to have any action tending to cause bunches under the leather, or to cause a pebbly effect at its surface. Sufficient cement will, however, be applied to cause satisfactory adhesion, the distribution of the cemented surfaces being such that the flexibility of the leather will not be impaired.

The top plate $i$ also acts to prevent lint etc. from falling into cement in the pan in addition to its function of removing surplus cement from about the top faces on the cement applying tubes.

I claim:

1. A cementing machine comprising a receptacle for containing a liquid cement, a grid disposed horizontally within said receptacle, a series of tubes mounted in said grid and extending upwardly therefrom in spaced relation, said tubes being open throughout the entire lengths thereof and each having a cement applying face at its top end disposed in approximately the same plane surface, and means for raising and lowering said grid to carry said tubes between positions in which said faces are submerged in the liquid of the receptacle and in which said faces are held above the liquid level therein.

2. A cementing machine comprising a receptacle for containing a liquid cement, a horizontally disposed support having a series of tubes mounted in spaced relation therein and extending upwardly therefrom in parallelism, each tube having an annular cement applying face at its upper end disposed in approximately the same plane surface, means for moving said support between positions in which said faces are submerged in the liquid of the receptacle and positions in which they are held above the liquid level therein and means for removing surplus cement from the exteriors of said tubes adjacent said faces as said support is lifted.

3. A cementing machine comprising a receptacle for containing liquid cement, a horizontally disposed support having a series of tubes mounted in spaced relation therein and extending vertically upwardly therefrom, said tubes opening at their lower ends to the under side of said support and having annular cement applying faces at their upper ends disposed in approximately the same horizontal plane, means for moving said support vertically between a position in which said faces are submerged in the liquid of the receptacle and a position in which they are held above the liquid level thereof and means for removing surplus cement from the interior of the upper portions of said tubes when in raised position.

4. A cementing machine comprising a receptacle for containing liquid cement, a horizontally disposed support having a series of tubes mounted in spaced relation therein and extending vertically upwardly therefrom, said tubes opening at their lower ends to the under side of said support and having annular cement applying faces at their upper ends disposed in approximately the same horizontal plane, a series of rods fixed in the bottom of said receptacle, each rod being extended upwardly within one of said tubes to a point above the liquid level in the receptacle, and means for moving said support vertically between a position in which said faces are submerged and a position in which they are held above the upper ends of said rods.

5. A cementing machine comprising a receptacle for containing liquid cement, a horizontally disposed support having a series of tubes mounted in spaced relation therein and extending vertically upwardly therefrom, said tubes opening at their lower ends to the under side of said support and having annular cement applying faces at their upper ends disposed in approximately the same horizontal plane, a horizontally disposed plate fixed directly over said receptacle and having apertures therethrough arranged in register with said tubes and within which said tubes are arranged to be slidably fitted and means for moving said support vertically between a position in which said faces are covered with the liquid in said receptacle and a position in which said tubes protrude above the top side of said plate.

6. A cementing machine comprising a receptacle for containing liquid cement, a horizontally disposed support having a series of tubes mounted in spaced relation therein and extending vertically upwardly therefrom, said tubes opening at their lower ends to the under side of said support and having annular cement applying faces at their upper ends disposed in approximately the same horizontal plane, a horizontally disposed plate fixed directly over said receptacle and having apertures therethrough arranged in register with said tubes and within which said tubes are arranged to be slidably fitted, a series of rods fixed in the bottom of said receptacle and on which said tubes respectively are slidably fitted, said rods being extended above the liquid level in said receptacle and terminated below the top surface of said plate and means for moving said support between a position in which said tubes are completely submerged in the liquid of the receptacle and a position in which their top ends protrude above said plate.

7. A cementing machine comprising a receptacle for containing liquid cement at a predetermined level, a horizontally disposed grid arranged to be raised and lowered within said receptacle, a series of tubes mounted in said grid and extending vertically upward therefrom, said tubes having annular cement applying faces at their top ends disposed at the same level and opening at their lower ends to the under side of the grid, a corresponding series of rods mounted within said receptacle and extending upwardly within said tubes to points above the liquid level in the receptacle and means for raising and lowering said grid to carry said tubes between a position in which their said faces are below said liquid level and a position in which said faces are above the top ends of said rods.

In testimony whereof, I have signed my name to this specification.

ARTHUR W. SMITH.